US 11,216,510 B2

(12) United States Patent
Jiang et al.

(10) Patent No.: US 11,216,510 B2
(45) Date of Patent: Jan. 4, 2022

(54) PROCESSING AN INCOMPLETE MESSAGE WITH A NEURAL NETWORK TO GENERATE SUGGESTED MESSAGES

(71) Applicant: ASAPP, INC., New York, NY (US)

(72) Inventors: Lisa Lijia Jiang, Brooklyn, NY (US); Tao Lei, Jersey City, NJ (US); Shawn Henry, Longmont, CO (US)

(73) Assignee: ASAPP, INC., New York, NY (US)

( * ) Notice: Subject to any disclaimer, the term of this patent is extended or adjusted under 35 U.S.C. 154(b) by 825 days.

(21) Appl. No.: 16/054,473

(22) Filed: Aug. 3, 2018

(65) Prior Publication Data

US 2020/0042613 A1  Feb. 6, 2020

(51) Int. Cl.
*G06N 3/02* (2006.01)
*G06F 16/9032* (2019.01)
*H04L 12/58* (2006.01)
*G06F 16/33* (2019.01)

(52) U.S. Cl.
CPC .... *G06F 16/90324* (2019.01); *G06F 16/3347* (2019.01); *G06N 3/02* (2013.01); *H04L 51/02* (2013.01)

(58) Field of Classification Search
CPC ........................................................ G06N 3/02
See application file for complete search history.

(56) References Cited

U.S. PATENT DOCUMENTS

| | | | |
|---|---|---|---|
| 5,195,034 A | 3/1993 | Garneau et al. | |
| 5,227,971 A | 7/1993 | Nakajima et al. | |
| 5,369,575 A | 11/1994 | Lamberti et al. | |
| 6,173,279 B1 | 1/2001 | Levin et al. | |
| 6,177,932 B1 | 1/2001 | Galdes et al. | |

(Continued)

FOREIGN PATENT DOCUMENTS

| | | |
|---|---|---|
| CN | 1633817 A | 6/2005 |
| CN | 105009556 A | 10/2015 |

(Continued)

OTHER PUBLICATIONS

Chen, Wenlin et al., "Compressing Neural Networks with the Hashing Trick", arXiv:1504.04788v1, https://arxiv.org/odf/1504.04788.pdf (accessed on Nov. 26, 2018), Apr. 19, 2015, 10 pages.

(Continued)

*Primary Examiner* — Olisa Anwah
(74) *Attorney, Agent, or Firm* — GTC Law Group PC & Affiliates

(57) ABSTRACT

Text of an incomplete message entered by a user may be processed using a neural network to suggest messages similar to the message the user is in the process of entering. Word embeddings may be obtained for the words of the text that represent the words in a first vector space. The word embeddings may then be processed by the neural network to compute an input message feature vector that represents the incomplete message in a second vector space. The input message feature vector may be used to select a first designated message as a suggestion from a set of designated messages, and the first designated message may be selected using a similarity score computed from the input message feature vector and a first designated message feature vector corresponding to the first designated message. The first designated message may then be presented as a suggestion to the user.

21 Claims, 9 Drawing Sheets

(56) References Cited

U.S. PATENT DOCUMENTS

| | | |
|---|---|---|
| 6,327,363 B1 | 12/2001 | Henderson et al. |
| 6,381,645 B1 | 4/2002 | Sassin et al. |
| 6,453,292 B2 | 9/2002 | Ramaswamy et al. |
| 6,915,254 B1 | 7/2005 | Heinze et al. |
| 6,981,040 B1 | 12/2005 | Konig et al. |
| 7,257,564 B2 | 8/2007 | Loughmiller et al. |
| 7,603,330 B2 | 10/2009 | Gupta et al. |
| 7,644,057 B2 | 1/2010 | Nelken et al. |
| 8,024,196 B1 | 9/2011 | Wodtke et al. |
| 8,054,951 B1 | 11/2011 | Winslow et al. |
| 8,156,138 B2 | 4/2012 | Kohn et al. |
| 8,271,403 B2 | 9/2012 | Rieck et al. |
| 8,494,152 B1 | 7/2013 | Roberts et al. |
| 8,577,671 B1 | 11/2013 | Barve et al. |
| 8,626,509 B2 | 1/2014 | Roy et al. |
| 9,043,197 B1 | 5/2015 | Pasca et al. |
| 9,336,269 B1 | 5/2016 | Smith et al. |
| 9,591,136 B1 | 3/2017 | Garcia et al. |
| 9,602,987 B1 | 3/2017 | Wittig |
| 9,715,496 B1 | 7/2017 | Sapoznik et al. |
| 9,723,151 B2 | 8/2017 | McGann et al. |
| 9,727,925 B2 | 8/2017 | Subramanian et al. |
| 9,742,916 B1 | 8/2017 | Christopher |
| 9,761,222 B1 | 9/2017 | Scarasso et al. |
| 9,762,733 B1 | 9/2017 | Ramanujaiaha |
| 9,805,371 B1 | 10/2017 | Sapoznik et al. |
| 9,807,037 B1 | 10/2017 | Sapoznik et al. |
| 9,875,440 B1 | 1/2018 | Commons |
| 9,892,414 B1 | 2/2018 | Henry |
| 10,049,663 B2 | 8/2018 | Orr et al. |
| 10,067,938 B2 | 9/2018 | Bellegarda |
| 10,083,451 B2 | 9/2018 | Sehrawat et al. |
| 10,083,690 B2 | 9/2018 | Giuli et al. |
| 10,089,072 B2 | 10/2018 | Piersol et al. |
| 10,097,690 B1 | 10/2018 | Henry |
| 10,109,275 B2 | 10/2018 | Henry |
| 10,127,908 B1 | 11/2018 | Deller et al. |
| 10,169,315 B1 | 1/2019 | Heckel et al. |
| 10,210,244 B1 | 2/2019 | Branavan et al. |
| 10,387,888 B2 | 8/2019 | Sapoznik et al. |
| 10,453,074 B2 | 10/2019 | Sapoznik et al. |
| 10,482,875 B2 | 11/2019 | Henry |
| 10,489,792 B2 | 11/2019 | Hackman et al. |
| 10,497,004 B2 | 12/2019 | Shaev et al. |
| 2003/0033288 A1 | 2/2003 | Shanahan et al. |
| 2003/0033347 A1 | 2/2003 | Bolle et al. |
| 2003/0103621 A1 | 6/2003 | Brown et al. |
| 2004/0003283 A1 | 1/2004 | Goodman et al. |
| 2004/0254904 A1 | 12/2004 | Nelken et al. |
| 2005/0076084 A1 | 4/2005 | Loughmiller et al. |
| 2005/0105712 A1 | 5/2005 | Williams et al. |
| 2005/0228790 A1 | 10/2005 | Ronnewinkel et al. |
| 2006/0112127 A1 | 5/2006 | Krause et al. |
| 2006/0173776 A1 | 8/2006 | Shalley et al. |
| 2007/0094217 A1 | 4/2007 | Ronnewinkel et al. |
| 2007/0100618 A1 | 5/2007 | Lee et al. |
| 2007/0121899 A1 | 5/2007 | Galvin |
| 2007/0168448 A1 | 7/2007 | Garbow et al. |
| 2008/0091435 A1 | 4/2008 | Strope et al. |
| 2008/0112620 A1 | 5/2008 | Jiang |
| 2008/0168070 A1 | 7/2008 | Naphade et al. |
| 2008/0168135 A1 | 7/2008 | Redlich et al. |
| 2011/0066634 A1 | 3/2011 | Phillips et al. |
| 2011/0082825 A1 | 4/2011 | Sathish et al. |
| 2011/0093414 A1 | 4/2011 | Xu et al. |
| 2011/0173346 A1 | 7/2011 | Neben |
| 2011/0239113 A1 | 9/2011 | Hung et al. |
| 2011/0270771 A1 | 11/2011 | Coursimault et al. |
| 2011/0286596 A1 | 11/2011 | Gressel et al. |
| 2011/0314012 A1 | 12/2011 | Kenthapadi et al. |
| 2012/0005515 A1 | 1/2012 | Reddi et al. |
| 2012/0053945 A1 | 3/2012 | Gupta et al. |
| 2012/0102130 A1 | 4/2012 | Guyot et al. |
| 2012/0266258 A1 | 10/2012 | Tuchman et al. |
| 2013/0143587 A1 | 6/2013 | Williams et al. |
| 2013/0144605 A1 | 6/2013 | Brager et al. |
| 2013/0166485 A1 | 6/2013 | Hoffmann et al. |
| 2013/0173604 A1 | 7/2013 | Li et al. |
| 2013/0317808 A1 | 11/2013 | Kruel et al. |
| 2014/0047234 A1 | 2/2014 | Davis et al. |
| 2014/0075004 A1 | 3/2014 | Van Dusen et al. |
| 2014/0079195 A1 | 3/2014 | Srivastava et al. |
| 2014/0180788 A1 | 6/2014 | George et al. |
| 2014/0278379 A1 | 9/2014 | Coccaro et al. |
| 2014/0282138 A1 | 9/2014 | Hopton et al. |
| 2014/0297268 A1 | 10/2014 | Govrin et al. |
| 2014/0297281 A1 | 10/2014 | Togawa et al. |
| 2014/0317030 A1 | 10/2014 | Shen et al. |
| 2014/0330818 A1 | 11/2014 | Raina et al. |
| 2014/0365209 A1 | 12/2014 | Evermann |
| 2015/0006143 A1 | 1/2015 | Skiba et al. |
| 2015/0032724 A1 | 1/2015 | Thirugnanasundaram et al. |
| 2015/0033106 A1 | 1/2015 | Stetson et al. |
| 2015/0052002 A1 | 2/2015 | Welch et al. |
| 2015/0073798 A1 | 3/2015 | Karov et al. |
| 2015/0142704 A1 | 5/2015 | London |
| 2015/0149177 A1 | 5/2015 | Kalns et al. |
| 2015/0154285 A1 | 6/2015 | Saarinen et al. |
| 2015/0178390 A1 | 6/2015 | Torras |
| 2015/0215624 A1 | 7/2015 | Wei |
| 2015/0220833 A1 | 8/2015 | Le |
| 2015/0220995 A1 | 8/2015 | Guyot et al. |
| 2015/0228275 A1 | 8/2015 | Watanabe et al. |
| 2015/0242385 A1 | 8/2015 | Bao et al. |
| 2015/0310377 A1 | 10/2015 | Duval et al. |
| 2015/0340032 A1 | 11/2015 | Gruenstein |
| 2015/0363393 A1 | 12/2015 | Williams et al. |
| 2015/0365387 A1 | 12/2015 | Good |
| 2016/0019816 A1 | 1/2016 | Parry et al. |
| 2016/0063067 A1 | 3/2016 | Maitra et al. |
| 2016/0078456 A1 | 3/2016 | Chakraborty et al. |
| 2016/0092688 A1 | 3/2016 | Wolrich et al. |
| 2016/0163311 A1 | 6/2016 | Crook et al. |
| 2016/0163314 A1 | 6/2016 | Fujii et al. |
| 2016/0180151 A1 | 6/2016 | Philbin et al. |
| 2016/0180838 A1 | 6/2016 | Parada San Martin et al. |
| 2016/0182672 A1 | 6/2016 | Kuperman et al. |
| 2016/0239846 A1 | 8/2016 | Arvapally et al. |
| 2016/0247068 A1 | 8/2016 | Lin |
| 2016/0255034 A1 | 9/2016 | Yuan |
| 2016/0323398 A1 | 11/2016 | Guo et al. |
| 2016/0328388 A1 | 11/2016 | Cao et al. |
| 2016/0364522 A1 | 12/2016 | Frey et al. |
| 2017/0011279 A1 | 1/2017 | Soldevila et al. |
| 2017/0013073 A1 | 1/2017 | Mendez et al. |
| 2017/0091320 A1 | 3/2017 | Psota et al. |
| 2017/0103324 A1 | 4/2017 | Weston et al. |
| 2017/0116982 A1 | 4/2017 | Gelfenbeyn et al. |
| 2017/0147682 A1 | 5/2017 | Alaqeeli et al. |
| 2017/0148073 A1 | 5/2017 | Nomula et al. |
| 2017/0200077 A1 | 7/2017 | Weston et al. |
| 2017/0213138 A1 | 7/2017 | Bojja et al. |
| 2017/0308523 A1 | 10/2017 | Wang et al. |
| 2017/0323016 A1 | 11/2017 | Feng et al. |
| 2018/0005112 A1 | 1/2018 | Iso-Sipila et al. |
| 2018/0012231 A1 | 1/2018 | Sapoznik et al. |
| 2018/0012232 A1 | 1/2018 | Sehrawat et al. |
| 2018/0013699 A1 | 1/2018 | Sapoznik et al. |
| 2018/0018562 A1 | 1/2018 | Jung |
| 2018/0032755 A1 | 2/2018 | Odinak |
| 2018/0052664 A1 | 2/2018 | Zhang et al. |
| 2018/0068233 A1 | 3/2018 | Miranda et al. |
| 2018/0121738 A1 | 5/2018 | Womack et al. |
| 2018/0131645 A1 | 5/2018 | Magliozzi et al. |
| 2018/0143965 A1 | 5/2018 | Willson et al. |
| 2018/0174037 A1 | 6/2018 | Henry |
| 2018/0174579 A1 | 6/2018 | Henry |
| 2018/0181807 A1 | 6/2018 | Yankov |
| 2018/0203848 A1 | 7/2018 | Perez et al. |
| 2018/0232434 A1 | 8/2018 | Geyik et al. |
| 2018/0239830 A1 | 8/2018 | Dialani et al. |
| 2018/0253734 A1 | 9/2018 | Henry |
| 2018/0329886 A1 | 11/2018 | Li et al. |
| 2018/0357439 A1 | 12/2018 | Osotio |

(56) References Cited

U.S. PATENT DOCUMENTS

| | | | |
|---|---|---|---|
| 2018/0365702 | A1 | 12/2018 | Sehrawat et al. |
| 2018/0376002 | A1 | 12/2018 | Abraham |
| 2019/0019197 | A1 | 1/2019 | Roberts et al. |
| 2019/0019503 | A1 | 1/2019 | Henry |
| 2019/0122101 | A1 | 4/2019 | Lei |
| 2019/0180288 | A1 | 6/2019 | Shaev et al. |
| 2019/0182383 | A1 | 6/2019 | Shaev et al. |
| 2019/0213601 | A1 | 7/2019 | Hackman et al. |
| 2019/0311375 | A1 | 10/2019 | Sapoznik et al. |
| 2019/0332658 | A1 | 10/2019 | Heckel et al. |
| 2020/0019609 | A1 | 1/2020 | Yu et al. |
| 2020/0043015 | A1 | 2/2020 | Shaev et al. |

FOREIGN PATENT DOCUMENTS

| | | | |
|---|---|---|---|
| WO | 2018009231 | A1 | 1/2018 |
| WO | 2018009432 | A1 | 1/2018 |
| WO | 2018160492 | A1 | 9/2018 |
| WO | 2019113409 | A1 | 6/2019 |
| WO | 2019113409 | A8 | 7/2019 |

OTHER PUBLICATIONS

De La Briandais, Rene , "File Searching Using Variable Length Keys", Proceedings of the 1959 Western Joint Computer Conference, https://pdfs.semanticscholar.org/3ce3/f4cc1c91d03850ed84ef96a08498e018d18f.pdf, 1959, pp. 295-298.

Hochreiter, Sepp et al. "Long Short-Term Memory",Neural Computation, vol. 9, Iss. 8, 1997, pp. 1735-1780.

Mikolov, Tomas et al., "Distributed Representations of Words and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.

Pennington, Jeffrey et al., "GloVe: Global Vectors forWord Representation", Empirical Methods in Natural Language Processing (EMNLP), http://www.aclweb.org/anthology/D14-1162, (accessed on Nov. 26, 2018 from https://nlp.stanford.edu/pubs/glove.pdf), 2014, pp. 1532-1543.

Sutskever, Ilya et al., "Sequence to Sequence Learning with Neural Networks", CoRR abs/1409.3215, http://arxv.org/abs/1409.3215, 2014, 9 pages.

Vincent, Pascal et al., "Extracting and Composing Robust Features with Denoising Autoencoders", Proceedings of the 25th International Conference on Machine Learning, Helsinki, Finland, http://www.cs.toronto.edu/~larocheh/publications/icml-2008-denoising-autoencoders.pdf (accessed on Nov. 26, 2018), 2008, 8 pages.

Vincent, Pascal et al., "Stacked Denoising Autoencoders: Learning Useful Representations in a Deep Network with a Local Denoising Criterion", Journal of Machine Learning Research 11, http://www.jmlr.org/papers/volume11/vincent10a/vincent10a.pdf, published Dec. 2010, pp. 3371-3408.

U.S. Appl. No. 16/189,584, filed Nov. 13, 2018, Pending, Jeremy Elliot Azriel Wohlwend et al.

U.S. Appl. No. 16/189,613, filed Nov. 13, 2018, Pending, Jeremy Elliot Azriel Wohlwend.

U.S. Appl. No. 16/663,872, filed Oct. 23, 2019, Pending, Kelsey Taylor Ball et al.

"Scikit-learn: Machine Learning in Python", scikit-learn 0.17.1 documentation, http://scikit-learn.org/stable/ (accessed on Sep. 20, 2016), 3 pages.

"Using algorithms for advanced customer care", Nokia Strategic white paper, https://resources.ext.nokia.com/asset/200614 (accessed Jul. 26, 2017), 2017, 11 pages.

16908347.4, , "European Application Serial No. 16908347.4, Extended European Search Report dated Nov. 20, 2019", ASAPP, Inc., 11 pages.

Al-Rfou, Rami et al., "Conversational Contextual Cues: The Case of Personalization and History for Response Ranking", CoRR abs/1606.00372, http://arxiv.org/abs/1606.00372, 2016, 10 pages.

Bahdanau, Dzmitry et al., "Neural Machine Translation by Jointly Learning to Align and Translate", CoRR abs/1409.0473, http://arxiv.org/abs/1409.0473, May 19, 2016, 15 pages.

Bengio, Yoshua et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.

Berger, Mark J. , "Large Scale Multi-label Text Classification with Semantic Word Vectors", published 2015 (Year: 2015), Department of Computer Science, Stanford University, Stanford, CA 94305, mjberger@stanford.edu, 2015, pp. 1-8.

Black, William J. et al., "Facile: Description of the NE System Used for MUC-7", Proceedings of the 7th Message Understanding Conference, https://www-nlpir.nist.gov/related_projects/muc/proceedings/muc_7_proceedings/facile_muc7.pdf, 1998, 10 pages.

Blei, David M. et al., "Latent Dirichlet Allocation", Journal of Machine Learning Research, vol. 3, 2003, pp. 993-1022.

Brown, Peter F. et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).

Cai, Lijuan et al., "Hierarchical Document Categorization with Support Vector Machines", CIKM'04, Washington, DC, USA, https://info.cs.uab.edu/zhang/Spam-mining-papers/Hierarchical.Data.Classification.with.Support.Vector.Machines.pdf, Nov. 8-13, 2004, 10 pages.

Carrier, Pierre L. et al., "LSTM Networks for Sentiment Analysis", http://deeplearning.net/tutorial/lstm.html, accessed on Sep. 20, 2016, 5 pages.

Chandar, Sarath et al., "Correlational Neural Networks", CoRR abs/1504.07225, http://arxiv.org/abs/1504.07225, Oct. 12, 2015, 27 pages.

Chen, Mia X. et al., "Gmail Smart Compose: Real-Time Assisted Writing", arXiv:1906.00080v1 [cs.CL], https://arxiv.org/pdf/1906.00080.pdf (accessed on Mar. 25, 2020), May 17, 2019, 9 pages.

Chen, Yun-Nung et al., "An empirical investigation of sparse log-linear models for improved dialogue act classification", IEEE International Conference on Acoustics Speech and Signal Processing, 2013, XP032507868,, 6 pages.

Chen, Yun-Nung et al., "An empirical investigation of sparse log-linear models for improved dialogue act classification", 2013 IEEE International Conference on Acoustics. Speech and Signal Processing. IEEE., 2013, 6 pages.

Chen, Yun-Nung , "An empirical investigation of sparse log-linear models for improved dialogue act classification.", 2013 IEEE International Conference on Acoustics, Speech and Signal Processing. IEEE, 2013, pp. 1-6.

Cheng, Yong et al., "Semi-Supervised Learning for Neural Machine Translation", CoRR abs/1606.04596, http://arxiv.org/abs/1606.04596, Dec. 10, 2016, 10 pages.

Collados, Jose C. , "On the contribution of neural networks and word embeddings in Natural Language Processing", published at Medium.com, Jan. 2018. (Year: 2018), http://www.josecamachocollados.com, Jan. 2018, pp. 1-7.

Courbariaux, Matthieu et al., "BinaryConnect: Training Deep Neural Networks with binary weights during propagations", CoRR, accessed at https://arxiv.org/pdf/1511.00363v3.pdf, 2015 (Jan. 3, 2017), 9 pages.

Deerwester, Scott et al., "Improving Information Retrieval with Latent Semantic Indexing", Proceedings of the 51st ASIS Annual Meeting (ASIS '88), vol. 25, Oct. 1988, pp. 36-40.

Deerwester, Scott et al., "Indexing by Latent Semantic Analysis", Journal of the Association for Information Science and Technology, vol. 41, iss. 6, Sep. 1990, pp. 391-407.

Frome, Andrea et al., "Large-scale Privacy Protection in Google Street View", 2009 IEEE 12th International Conference on Computer Vision https://pdfs.semanticscholar.org/e645/6ac0e57396f222689dc71a310c2779a31488.pdf, Sep. 29-Oct. 2, 2009, 8 pages.

Gong, Yunchao et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 817-824.

(56) References Cited

OTHER PUBLICATIONS

Goodfellow, Ian J. et al., "Generative Adversarial Nets", Advances in Neural Information Processing Systems 27 (NIPS 2014), https://papers.nips.cc/paper/5423-generative-adversarial-nets.pdf, 2014, p. 2672-2680.

Gray, R., "Vector quantization", IEEE ASSP Magazine, vol. 1, iss. 2 https://ieeexplore.ieee.org/document/1162229/ (abstract only), Apr. 1984, pp. 4-29.

Henderson, Matthew et al., "Efficient Natural Language Response Suggestion for Smart Reply", arXiv:1705.00652v1, https://arxiv.org/pdf/1705.00652.pdf (accessed Aug. 15, 2018), May 1, 2017, 15 pages.

Hochreitner, Sepp et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.

Huang, Zhiheng et al., "Bidirectional LSTM-CRF Models for Sequence Tagging", arXiv:1508.01991v1, https://arxiv.org/pdf/1508.01991.pdf, Aug. 9, 2015, 10 pages.

Iyyer, Mohit et al., "Deep Unordered Composition Rivals Syntactic Methods for Text Classification", Association for Computational Linguistics (ACL), http://cs.umd.edu/~miyyer/pubs/2015_acl_dan.pdf, 2015, 11 pages.

Ji, Zongcheng et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.

Karpathy, Andrej, "The Unreasonable Effectiveness of Recurrent Neural Networks", http://karpathy.github.io/2015/05/21/rnn-effectiveness/, (accessed on Sep. 20, 2016), May 21, 2015, 42 pages.

Kim, Yoon et al., "Character-Aware Neural Language Models", CoRR abs/1508.06615, http://arxiv.org/abs/1508.06615, 2015, 9 pages.

Kim, Yoon, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.

Kiros, Ryan et al., "Skip-Thought Vectors", Proceedings of the 28th International Conference on Neural Information Processing Systems, vol. 2., 2015, pp. 3294-3302.

Lafferty, John et al., "Conditional Random Fields: Probabilistic Models for Segmenting and Labeling Sequence Data", https://repository.upenn.edu/cgi/viewcontent.cgi?article=1162&context=cis_papers, The definitive version was published in Proceedings of the 18th International Conference on Machine Learning 2001 (ICML2001), pp. 282-289, Jun. 2001, 10 pages.

Lai, Hanjiang et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Learning_2015_CVPR_paper.pdf, 2015 (accessed Janaury 3, 2017), pp. 3270-3278.

Lai, Siwei et al., "Recurrent Convolutional Neural Networks for Text Classification", AAAI'15 Proceedings of the Twenty-Ninth AAAI Conference on Artificial Intelligence, 2015, pp. 2267-2273.

Lample, Guillaume et al., "Unsupervised Machine Translation Using Monolingual Corpora Only", CoRR abs/1711.00043, http://arxiv.org/abs/1711.00043, Oct. 31, 2017, 12 pages.

Larochelle, Hugo et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.

Le, Quoc et al., "Distributed Representations of Sentences and Documents", Proceedings of the 31st International Conference on Machine Learning, W&CP vol. 32, Beijing, China, 2014, 9 pages.

Lee, Cheongjae et al., "Robust Dialog Management with N-best Hypotheses Using Dialog Examples and Agenda", Proceedings of ACL-08: HLT, Columbus, Ohio, Jun. 2008, pp. 630-637.

Levy, Omer et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.

Li, Jiwei et al., "A Hierarchical Neural Autoencoder for Paragraphs and Documents", Proceedings of the 53rd Annual Meeting of the Association for Computational Linguistics and the 7th International Joint Conference on Natural Language Processing, Beijing, China, http://web.stanford.edu/~jurafsky/pubs/P15-1107.pdf, Jul. 26-31, 2015 (accessed on Jan. 3, 2017), p. 1106-1115.

Lin, Hui et al., "Multi-document Summarization via Budgeted Maximization of Submodular Functions", In Proceed. of Human Language Technologies: The Con. of the North American Chapter of the Association for Computational Linguistics (NAACL-HLT), (accessed Nov. 26, 2018 at https://pdfs.semanticscholar.org/6286/a97ae2d9cff9b69f14d6cee3c611a1a63379.pdf), 2010, pp. 912-920.

Lin, Zhouhan et al., "A Structured Self-Attentive Sentence Embedding", arXiv: 1703.03130v1, https://arxiv.org/pdf/1703.03130.pdf (accessed Jul. 13, 2017), Mar. 9, 2017, 15 pages.

Logeswaran, Lajanugen et al., "An Efficient Framework for Learning Sentence Representations", International Conference on Learning Representations, https://openreview.net/pdf?id=rJvJXZb0W, 2018, 16 pages.

Logeswaran, Lajanugen et al., "An efficient framework for learning sentence Yepresentations", ICLR 2018 Conference Blind Submission, https://openreview.net/pdf?id=rJvJXZbOW (accessed Nov. 26, 2018), Feb. 15, 2018, 16 pages.

Miao, Yishu et al., "Neural Variational Inference for Text Processing", CoRR abs/1511.06038, http://arxiv.org/abs/1511.06038, 2015, 15 pages.

Mikolov, Tomas et al., "Distributed Representations of Words and Phrases and their Compositionality", CoRR abs/1310.4546, http://arxiv.org/abs/1310.4546, 2013, 9 pages.

Mikolov, Tomas et al., "Recurrent neural network based language model", Interspeech 2010, Sep. 26-30, 2010, Makuhari, Chiba, Japan, 2010, pp. 1045-1048.

Mikolov, Tomas et al., "Recurrent neural network based language model", INTERSPEECH 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan. 3, 2017), pp. 1045-1048.

Mühler, Vincent, "Building a Node.js WebSocket Chat App with Socket.io and React", Tutorial to Socket.io with JavaScript, Feb. 22, 2018, 12 pages.

Pagliardini, Matteo et al., "Unsupervised Learning of Sentence Embeddings using Compositional n-Gram Features", CoRR abs/1703.02507, http://arxiv.org/abs/1703.02507, Jul. 10, 2017, 11 pages.

PCT/US2016/049896, , "Application Serial No. PCT/US2016/049896, International Search Report and the Written Opinion dated May 19, 2017", 14 pages.

PCT/US2016/049896, , "International Application Serial No. PCT/US2016/049896, International Preliminary Report on Patentability dated Jan. 17, 2019", ASAPP, Inc., 9 pages.

PCT/US2017/040205, , "Application Serial No. PCT/US2017/040205, International Search Report and the Written Opinion dated Sep. 15, 2017", 11 pages.

PCT/US2017/040205, , "International Application Serial No. PCT/US2017/040205, International Preliminary Report on Patentability dated Jan. 17, 2019", ASAPP, Inc., 9 pages.

PCT/US2018/064404, , "International Application Serial No. PCT/US2018/064404, International Search Report and Written Opinion dated Feb. 25, 2019", ASAPP, Inc., 9 pages.

PCT/US2019/014569, , "International Application Serial No. PCT/US2019/014569, International Search Report and Written Opinion dated Mar. 4, 2019", ASAPP, Inc., 13 pages.

Rush, Alexander M. et al., "Optimal Beam Search for Machine Translation", Proceedings of EMNLP 2013, Oct. 18-21, 2013, Seattle, Washington, USA, 2013, 12 pages.

Scott, Tyler R. et al., "Adapted Deep Embeddings: A Synthesis of Methods for k-Shot Inductive Transfer Learning", arXiv:1805.08402v4 [cs.LG], https://arxiv.org/pdf/1805.08402.pdf, Oct. 27, 2018, 12 pages.

See, Abigail et al., "Get To The Point: Summarization with Pointer-Generator Networks", CoRR abs/1704.04368, http://arxiv.org/abs/1704.04368, Apr. 25, 2017, 20 pages.

(56) References Cited

OTHER PUBLICATIONS

Shen, Tianxiao et al., "Style Transfer from Non-Parallel Text by Cross-Alignment", CoRR abs/1705.09655, http://arxiv.org/abs/1705.09655, Nov. 6, 2017, 12 pages.

Shi, Yangyang et al., "Contextual spoken language understanding using recurrent neural networks.", 2015 IEEE International Conference on Acoustics, Speech and Signal Processing (ICASSP). IEEE, 2015, pp. 5271-5275.

Snell, Jake et al., "Prototypical Networks for Few-shot Learning", arXiv:1703.05175v2 [cs.LG], https://arxiv.org/pdf/1703.05175.pdf, Jun. 19, 2017, 13 pages.

Tai, Kai S. et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.

Ustinova, Evgeniya et al., "Learning Deep Embeddings with Histogram Loss", arXiv:1611.00822v1 [cs.CV], https://arxiv.org/pdf/1611.00822.pdf, Nov. 2, 2016, 9 pages.

Vinyals, Oriol et al., "A Neural Conversational Model", CoRR abs/1506.05869, http://arxiv.org/abs/1506.05869, 2015, 8 pages.

Wang, Sida et al., "Baselines and Bigrams: Simple, Good Sentiment and Topic Classification", Proceedings of the 50th Annual Meeting of the Association for Computational Linguistics, Jeju, Republic of Korea, https://www.aclweb.org/anthology/P12-2018, Jul. 8-14, 2012, pp. 90-94.

Xiao, Yijun et al., "Efficient Character-level Document Classification by Combining Convolution and Recurrent Layers", CoRRabs/1602.00367, https://arxiv.org/pdf/1602.00367.pdf, Feb. 1, 2016, 10 pages.

Yu, Mo et al., "Diverse Few-Shot Text Classification with Multiple Metrics", Proceedings of the 2018 Conference of the North American Chapter of the Association for Computational Linguistics: Human Language Technologies, vol. 1 (Long Papers), New Orleans, Louisiana, https://www.aclweb.org/anthology/N18-1109, Jun. 2018, pp. 1206-1215.

Zhang, Xiang et al., "Character-level Convolutional Networks for Text Classification", CoRR abs/1509.01626, http://arxiv.org/abs/1509.01626, 2015, 9 pages.

Zhao, Han et al., "Self-Adaptive Hierarchical Sentence Model", CoRR abs/1504.05070, http://arxiv.org/abs/1504.05070, Apr. 27, 2015, 8 pages.

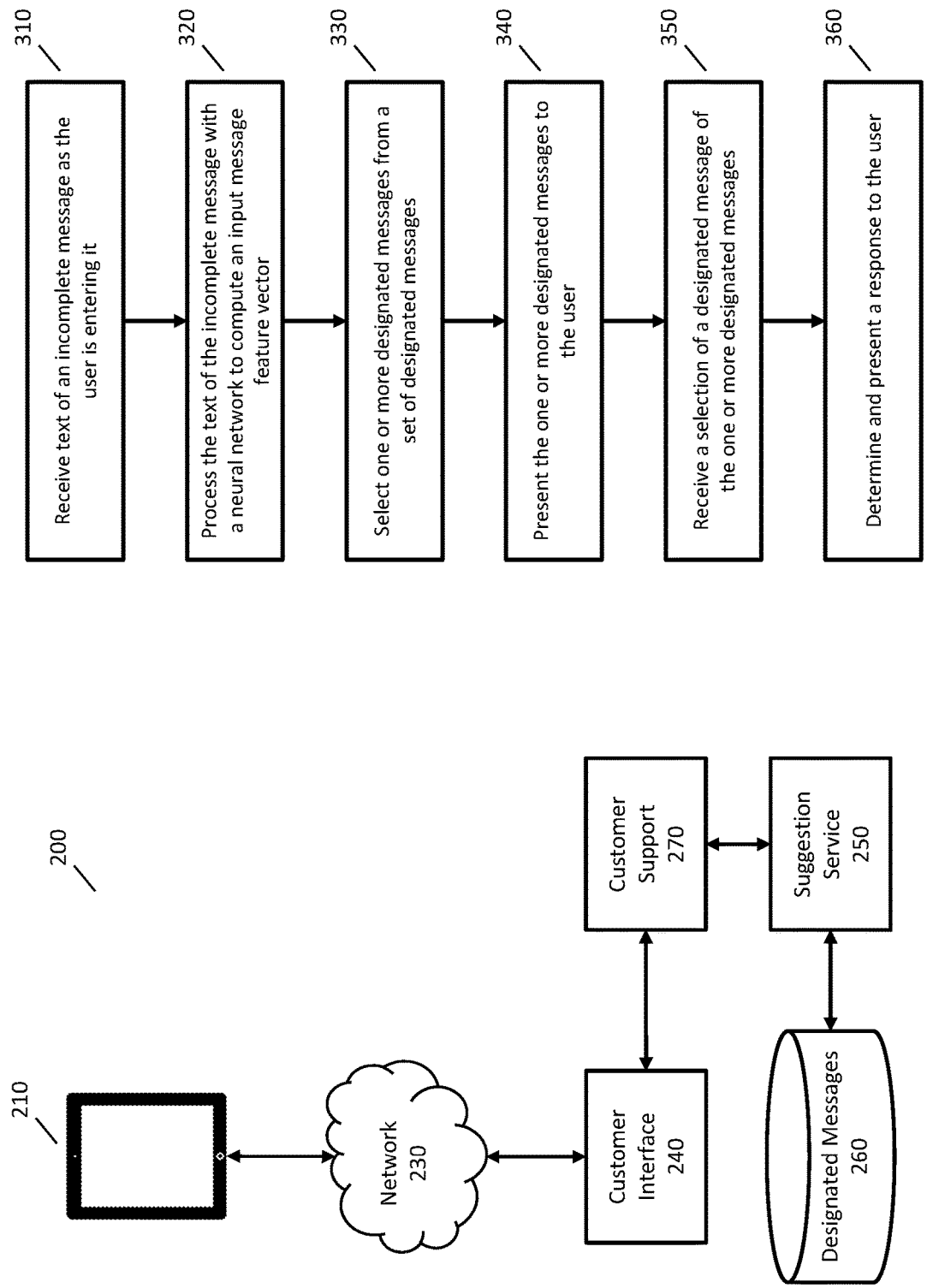

PROCESSING AN INCOMPLETE MESSAGE WITH A NEURAL NETWORK TO GENERATE SUGGESTED MESSAGES

FIELD OF THE INVENTION

The present invention relates to processing text of an incomplete message with a neural network to generate suggest messages.

BACKGROUND

People may exchange messages for various purposes, such as friends coordinating social events or a customer of a company seeking support from a company. The process of entering a message may be cumbersome, especially when a person is busy, multitasking, or using a mobile device with less convenient input capabilities. To make it easier for a person to send a message, it may be desired to present suggested messages to the person so that the person may select a suggested message and obviate the need to enter complete messages.

BRIEF DESCRIPTION OF THE FIGURES

The invention and the following detailed description of certain embodiments thereof may be understood by reference to the following figures:

FIG. 2 is an example system for suggesting a message to a user.

FIG. 3 is a flowchart of an example method for suggesting a message to a user.

DETAILED DESCRIPTION

Figure 1C:
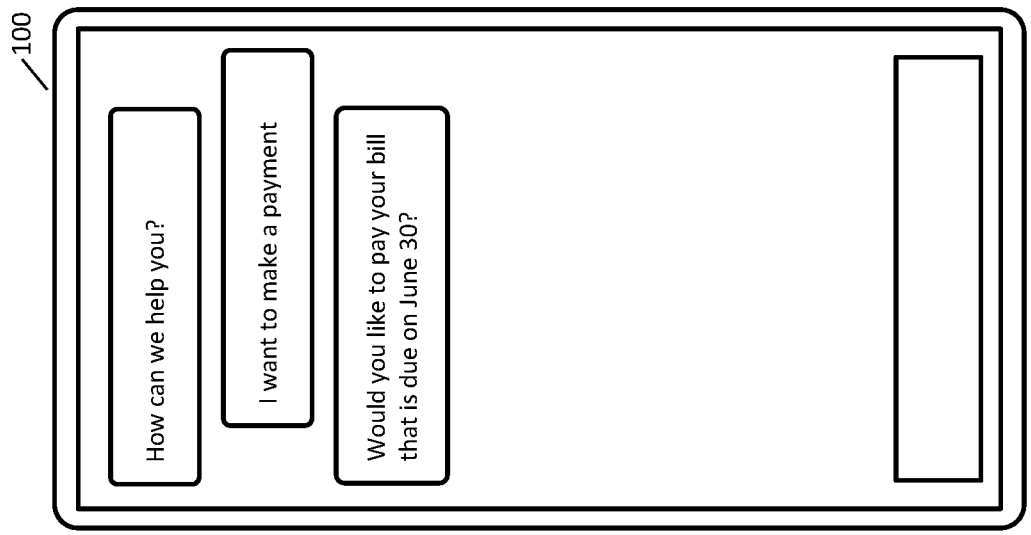
FIGS. 1A-C are example user interfaces for suggesting a message to a user.

People may exchange messages with each other using a variety of techniques and in a variety of situations. For example, a person may type or speak a message to an app running on his device, type or speak a message on a web page, send a text message, or send an email. As used herein, a text message includes any message sent as text including but not limited to a message sent using SMS (short message service) or a special-purpose application (e.g., Facebook messenger, Apple iMessage, Google Hangouts, or WhatsApp). People may exchange messages for any appropriate purpose, such as social interactions, business interactions, or to request customer support from a company. The techniques described herein are not limited to any manner of or purpose for exchanging messages.

Entering a message may be cumbersome as compared to speaking directly with a person. For example, entering a message with a keyboard (especially on a mobile device) or even dictating a message using automatic speech recognition may take more time and attention than desired and may contain errors or typos.

To facilitate the process of entering a message, one or more suggested messages may be presented to a person. For example, a person may begin to enter a message by entering one or more words of the message. While the user is entering the one or more words, suggested messages may be presented to the person, and the person may select and send a suggested message by tapping or clicking it. The suggested messages may be updated as the person continues to enter words and characters. For example, the person may enter "Make" and a first set of messages may be suggested. The person may continue to enter "Make a p" and a second set of messages may be suggested The process of suggesting messages to a person may be improved by using a set of designated messages. Suggesting messages using a set of designated messages may provide the following improvements. When a person enters a message, there may be ambiguity or uncertainty in the meaning of the message because the person may be acting quickly or not paying attention. Suggesting a message from a set of designated messages may improve communication by removing or lessening ambiguity of transmitted messages. For example, when messages are suggested in the context of providing customer support, the designated messages may be easier to understand for automated processing or when processed by a customer service representative. Suggesting messages saves time for the person entering the message because they don't have to enter as many words or characters and may save them time and make messaging more convenient. Suggesting messages may also avoid the inclusion of unnecessary text that may slow down or cause inaccuracies when using automated processing or processing by a person. For example, a person may use filler words (such as "um" and "ah"), have trouble articulating their request, or use long pleasantries.

The set of designated messages may include all messages that may be suggested to a person. For example, where messages are suggested for a customer seeking customer support from a company, the set of designated messages may include a number of most common messages received from customers. As the person is entering a message, the text of the incomplete message is processed to select one or more designated messages as suggestions to the person. The designated messages may be selected using a neural network and/or a prefix tree or trie, as described in greater detail below.

Figure 1B:
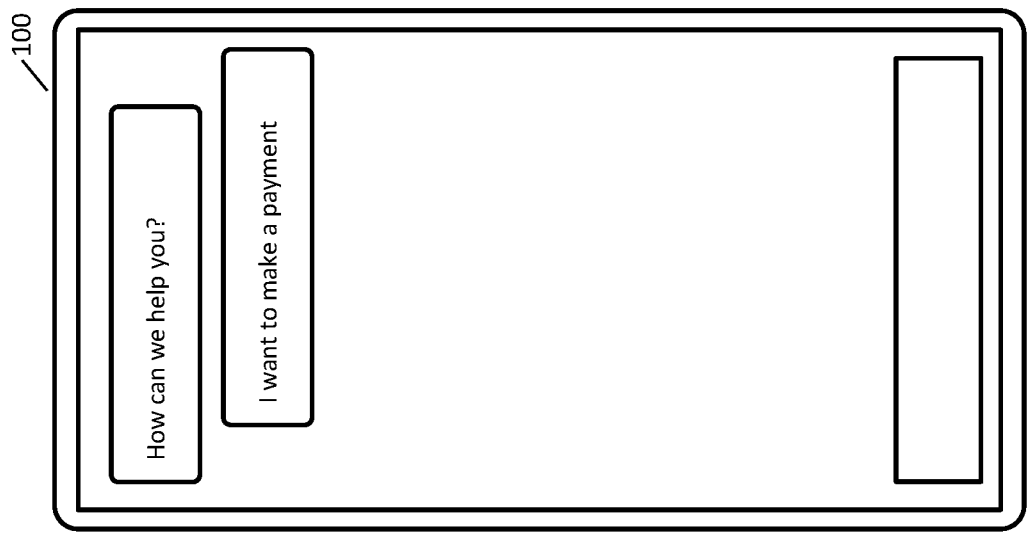
Figure 1A:
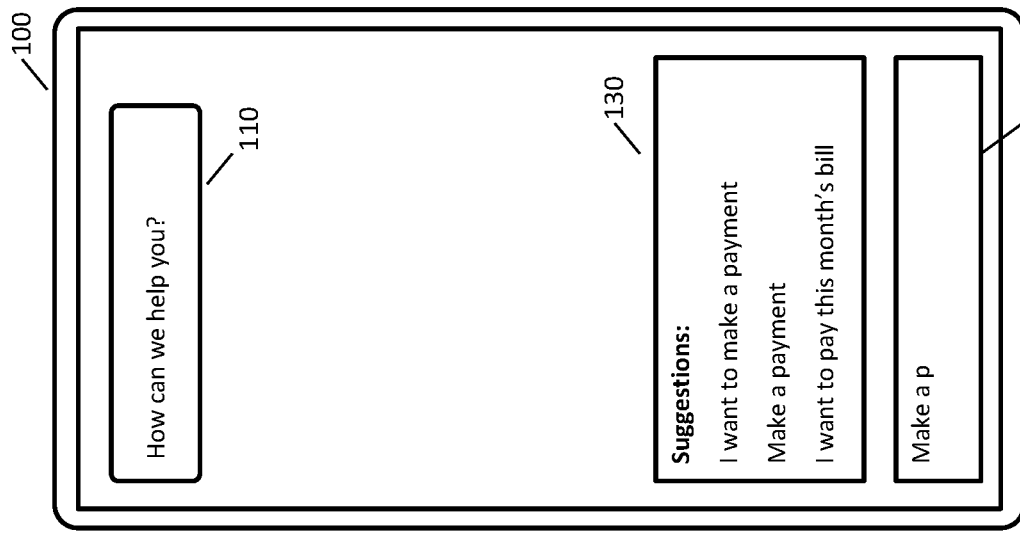

FIGS. 1A-C illustrate an example of suggesting messages by processing text of an incomplete message. In FIGS. 1A-C, a customer is requesting customer support using customer device 100 (e.g., a smart phone), and several messages between the company and customer are presented. FIGS. 1A-C are exemplary, and the techniques described herein are not limited to this example of providing customer service.

In FIG. 1A, a customer has opened an application to request customer service from a company. The application presents an introductory message 110 to the customer, such as "How can I help you today?" The customer starts entering a message in text entry box 120, and as the customer is typing the message, the text is processed to suggest messages to the customer. In this snapshot, the customer has entered "Make a p". The text of the incomplete message is processed to determine three suggested messages that the customer may want to send, and these three suggested messages are shown in suggestions box 130.

The customer may continue to enter text, and as the customer enters more text, the suggested messages may be updated using the newly entered text. Alternatively, the customer may select one of the suggested messages. A suggested message may be selected using any appropriate techniques, such as touching or tapping on a suggested message.

FIG. 1B illustrates the customer device 100 after the customer has selected the suggested message "I want to make a payment." After the message is selected, it may appear in the conversation history and may be transmitted to the company for further processing. In some implementations, a customer may select a suggested message and then edit the suggested message before transmitting the message to the company.

FIG. 1C illustrates the customer device 100 after the company has responded to the suggested message that was selected by the customer. For example, the company may use a human customer service representative to respond to the customer or may use automated techniques to respond to the customer. In this example, the company has responded with the message indicated in FIG. 1C.

After the company has responded to the customer, the customer may again start entering text, and suggested messages may again be presented to the customer as he is entering the text. Messages may be suggested to the customer each time the customer starts typing a message.

FIG. 2 is an example system 200 for suggesting messages to a user. In system 200, a customer may use customer device 210 to transmit a message for seeking customer support from a company. As the message is being entered, text of the message may be transmitted using network 230, which may be any appropriate network such as the Internet or cellular data network.

Customer interface component 240 may implement any appropriate actions for interfacing with a customer. For example, customer interface component 240 may establish a network connection with a customer support component 270 that is responsible for providing customer support using automated techniques or with a customer service representative. Customer support component 270 may also receive the text of the message as it is being entered by the customer and obtain suggested messages for presentation to the customer. For example, customer support component 270 may transmit the text to suggestion service 250 and receive suggested messages to transmit to customer device 210.

Suggestion service 250 may perform any of the techniques described herein to determine one or more suggested messages using the text received from the customer. For example, suggestion service 250 may process the text with a neural network and/or use a prefix tree to determine one or more suggested messages, as described in greater detail below. Suggestion service 250 may obtain suggested messages from designated messages data store 260, which may store a set of designated messages that include all messages that may be suggested to a customer.

FIG. 3 is a flowchart of an example method for suggesting messages from text of an incomplete message. In FIG. 3 and other flowcharts herein, the ordering of the steps is exemplary and other orders are possible, not all steps are required, steps may be combined (in whole or part) or sub-divided and, in some implementations, some steps may be omitted or other steps may be added. The methods described by any flowcharts described herein may be implemented, for example, by any of the computers or systems described herein.

At step 310, text of an incomplete message is received as a user is entering the message. The message may include text and/or audio and may be sent using any appropriate techniques. Where the message includes audio, automatic speech recognition may be used to obtain text corresponding to the audio. At step 320, the text of the incomplete message is processed with a neural network to compute an input message feature vector, such as by using any of the techniques described in greater detail below. The input message feature vector may represent the text of the incomplete message in a vector space. At step 330, one or more designated messages are selected from a set of designated messages using the input message feature vector. For example, each designated message in the set of designated messages may be associated with a designated message feature vector, and designated messages may be selected by computing a similarity between the input message feature vector and the designated message feature vectors. At step 340, the selected one or more designated messages are presented to the user, such as presented in FIG. 1A. At step 350, a selection of a suggested message is received from the user. For example, an indication (such as an AJAX request or an HTML post) may be received that identifies a selected suggested message. At step 360, the selected suggested message is processed, and a response is determined and presented to the user, such as in FIG. 1C.

Designated Messages

To suggest messages as described above, a data store of designated messages may need to be created. When suggesting messages, the possible suggested messages may be limited to a set of designated messages. A set of designated messages may be created to cover most likely messages that a user would like to send. Selecting messages from a set of designated messages may provide assurance that undesirable or improper messages are not suggested to a user (such as messages with improper grammar or profanity).

Any appropriate techniques may be used to create a data store of designated messages, such as creating designated messages manually. In some implementations, a corpus of existing messages may be used to create designated messages. Any appropriate corpus of messages may be used, such as corpus of messages logged from a messaging application or a corpus of messages logged from customer service sessions.

Figure 4:
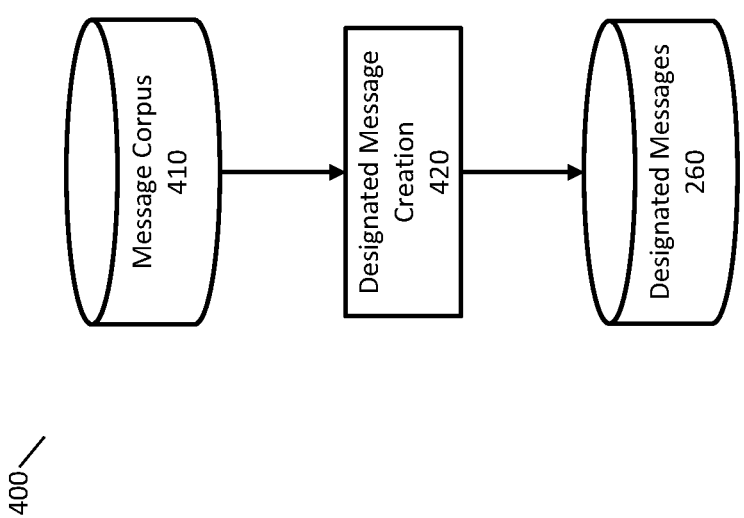
FIG. 4 is an example system for creating a set of designated messages from a message corpus.

FIG. 4 illustrates an example system 400 for obtaining a data store of designated messages from a corpus of messages. In FIG. 4, message corpus data store 410 may include any appropriate messages from which designated messages may be obtained. Designated message creation component 420 may process the messages in message corpus data store 410 to generate a set of designated messages and store the set of designated messages in designated messages data store 260. Designated message creation component 420 may use any appropriate techniques, such as any of the techniques described in FIG. 5 or elsewhere herein.

Figure 5:
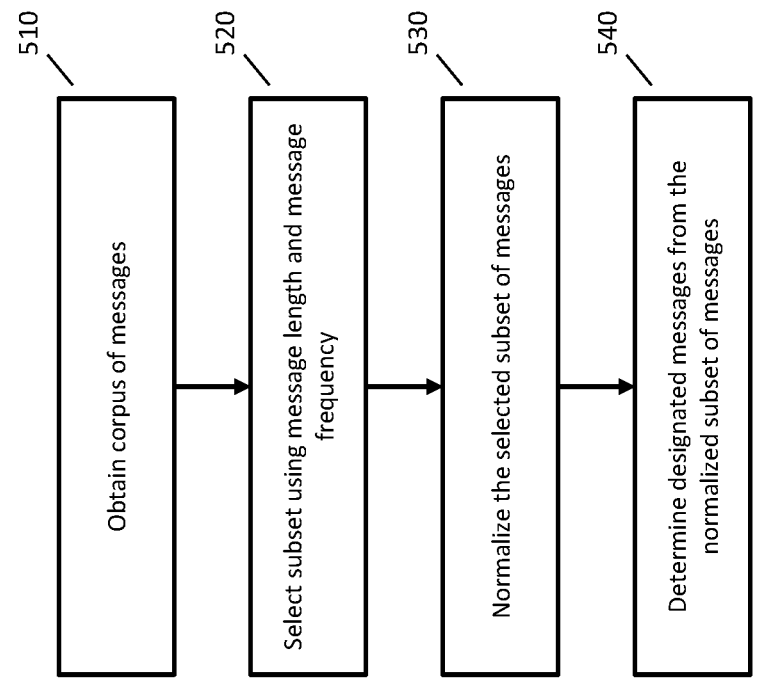
FIG. 5 is a flowchart of an example method for creating a set of designated messages.

FIG. 5 is a flowchart of an example method for determining a set of designated messages from a corpus of messages. At step 510, a corpus of messages is obtained, such as any corpus of messages described herein.

At step 520, a subset of the corpus of messages is selected. Any appropriate techniques may be used to select the subset of messages. For example, the following factors may be considered when selecting messages: the length of a message, the number of times the message appears in the corpus of messages, or a probability of the message occurring as determined using a language model.

In some implementations, all messages with a number of characters less than a character cutoff may be selected. For example, the character cutoff may be determined by considering tradeoffs of message length versus coverage of the messages in the message corpus. In some implementations, a character cutoff may be determined by ordering messages in a message corpus from shortest to longest and determining a set of shortest messages that provide a desired coverage of the entire message corpus, such as 80% coverage. The character cutoff may be determined as the number of characters in the longest message of the set providing the desired coverage.

In some implementations, the selected character cutoff may be adjusted to improve the quality of suggested messages. For example, a similarity score of messages in the selected subset of the corpus of messages may be used to adjust the character cutoff. Where the selected messages are too similar, the character cutoff may be increased to consider a larger subset of the corpus of messages, or where the number of selected messages is too large, the number of characters may be decreased to select a smaller subset of the corpus of messages.

At step 530, the selected subset of messages is normalized. Any appropriate normalization techniques may be used, such as normalizing capitalization, removing punctuation, removing greetings ("hi," "hello," or "please"), or replacing words (e.g., replacing "u" with "you"). Messages that are the same after normalization may be combined. When performing the normalization, a frequency or count of the original messages corresponding to each normalized message may be maintained. For example, where two messages are identical after normalization but were not identical before normalization (e.g., one contains "you" and the other contains "u"), the normalized message may be stored with a frequency of two.

At step 540, the set of designated messages is determined from the normalized subset of messages. Any appropriate techniques may be used to determine the set of designated messages, such as selecting the normalized messages that appear most frequently in the corpus of messages.

The selection of the set of designated messages as described herein may reduce required resources for suggesting messages. The set of designated messages may be significantly smaller than the corpus of messages and may thus reduce processing, memory, storage, or communications requirements. Using an appropriately chosen set of designated messages may reduce required resources while maintaining the quality of suggested messages that are presented to users.

The performance of a deployed system may be evaluated (e.g., determining how often suggested messages are selected by users or whether users edit suggested messages), and processing of FIG. 5 may be adjusted to improve performance. For example, a character cutoff may be adjusted to determine if performance would be improved with a higher or lower character cutoff in selecting the set of designated messages.

In some implementations, an intent classifier may be used when determining the set of designated messages from the normalized subset of messages. For example, it may be desired that the set of designated messages include at least one designated message for each intent of the intent classifier. In some implementations, a number of most frequent normalized messages may be selected, and an intent may be determined for each of the selected normalized messages. Where there are no normalized messages for an intent, one or more additional normalized messages may be selected to ensure that each intent has at least on normalized message. For example, designated messages may be selected using a submodular maximization algorithm, such as the algorithm described in Multi-document summarization via budgeted maximization of submodular functions, HLT '10 Human Language Technologies: The 2010 Annual Conference of the North American Chapter of the Association for Computational Linguistics, pp. 912-920, which is herein incorporated by reference.

In some implementations, submodular maximization may be used at step 540 to determine the set of designated messages. Submodular maximization may improve the determination of the set of designated messages in that it may avoid selecting highly similar messages (e.g., "I want to make a payment" and "I need to make a payment") and also help ensure that the designated messages cover many different types of messages that may be desired by users.

After a set of designated messages has been determined, it may be stored in a data store, such as designated messages data store 260.

Message Selection

The set of designated messages may be used to suggest messages to a user as the user is entering text of a message. Messages may be selected from the set of designated messages using multiple techniques, such as by processing the text of the entered message with a neural network to select messages or by performing prefix matching to select messages.

Figure 6:
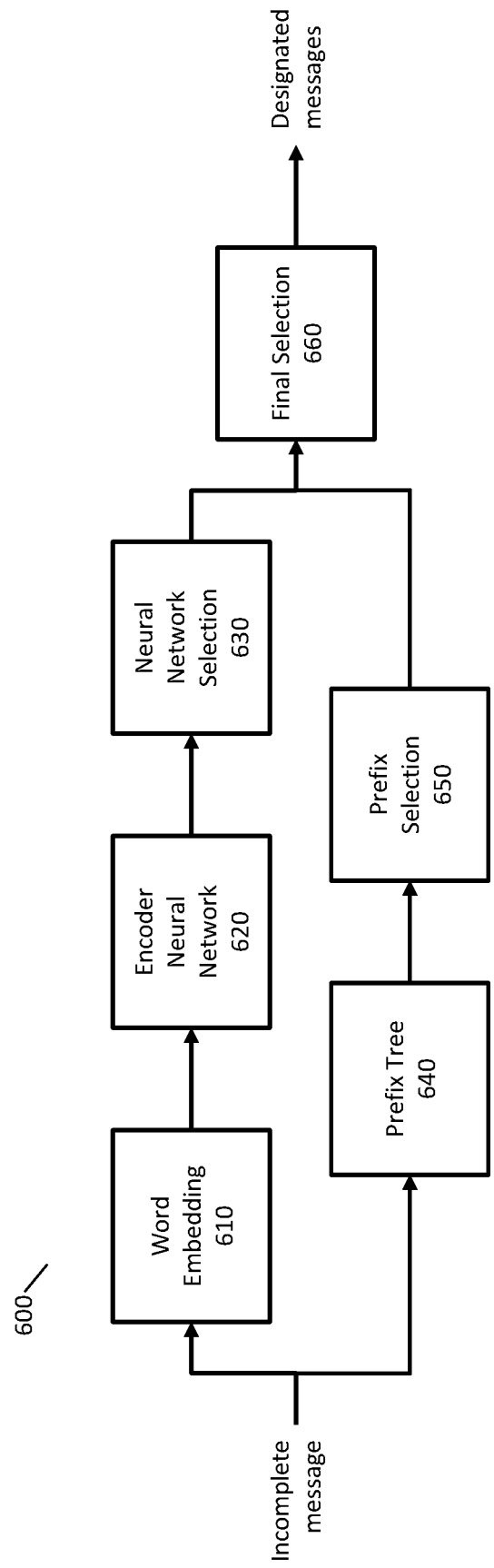
FIG. 6 is an example system for selecting suggested messages using a neural network and/or a prefix tree.

FIG. 6 is an example system 600 that may be used to select messages from the set of designated messages as suggested messages for a user. In FIG. 6 text of an incomplete message entered by a user is received for processing.

Word embedding component 610 may process the text of the incomplete message to obtain a word embedding for each word of the incomplete message. A word embedding is a vector in an N-dimensional vector space that represents the word but does so in a manner that preserves useful information about the meaning of the word. For example, the word embeddings of words may be constructed so that words with similar meanings or categories may be close to one another in the N-dimensional vector space. For example, the word embeddings for "cat" and "cats" may be close to each other because they have similar meanings, and the words "cat" and "dog" may be close to each other because they both relate to pets. Word embeddings may be trained in advance using a training corpus, and when obtaining the word embeddings, a lookup may be performed to obtain a word embedding for each word of the incomplete message.

Any appropriate techniques may be used to compute word embeddings from a training corpus. For example, the words of the training corpus may be converted to one-hot vectors where the one-hot vectors are the length of the vocabulary and the vectors are 1 in an element corresponding to the word and 0 for other elements. The one-hot vectors may then be processed using any appropriate techniques, such as the techniques implemented in Word2Vec or GloVe software. A word embedding may accordingly be created for each word in the vocabulary. In some implementations, word embeddings that include information about the characters in the words may be used, such as the word-character embeddings described in U.S. patent application Ser. No. 15/964,629, and/or in U.S. patent application Ser. No. 16/035,062, each of which are incorporated herein by reference.

A set of word embeddings may be determined from a vocabulary of words, such as the 50,000 most common words from a training corpus, and a word embedding may be computed for each word of the vocabulary. A word that is not in the vocabulary is an out-of-vocabulary word (OOV word). In some implementations, an additional embedding may also be added to represent all OOV words.

Since text of an incomplete message is being processed as the user is entering the message, the text may end in a partial word. Where the text ends in a partial word, that partial word may not be a word in the vocabulary (e.g., "categ" when the user is entering "category") or may be a word different from the word the user is in the process of entering (e.g., "cat" instead of "category"). In some implementations, it may be determined when the text ends in an incomplete word, that partial word may be skipped or not processed. For example, where a final sequence of letters does not correspond a word in the vocabulary (e.g., "categ"), the final sequence of letters may not be processed. For another example, where the final sequence of letters is a word in the vocabulary (e.g., "cat"), but is a low probability word as determined by a language model, it may be determined that the letters likely correspond to an incomplete word and the letters may not be processed.

In some implementations, word embedding component 610 may compute word embeddings for OOV words, such as incomplete words. Computing a word embedding for an OOV word may provide better performance than using a single embedding for all OOV words or skipping OOV words. Any appropriate techniques may be used to compute word embeddings for OOV words.

In some implementations, word embeddings of OOV words may be computed by hashing random seeds. To compute the word embedding, a hash is computed from the letters of the OOV word, and the hash is used as a seed for a random number generator. A word embedding may then be obtained by sampling the random number generator. Because a random number generator always produces the same value for a given seed, a particular OOV word will always produce the same word embedding. Because the word embedding is computed from the OOV word, there is no need to store the word embedding of the OOV word and it may be computed from the OOV word as needed.

For example, a word embedding may be computed as follows:

$$s = H(w) \% (2^{32} - 1)$$

$$e = \sim \mathcal{N}(0, \sigma^2, s)$$

where w is an OOV word; H is a hash function that computes a hash from the letters of the OOV word; % is the modulus operator (the remainder after division); $2^{32}$ is the size of an integer used for a random seed; $\mathcal{N}(0, \sigma^2, s)$ indicates sampling a Gaussian vector random vector with a zero mean vector, a diagonal covariance matrix with variance $\sigma^2$, and a seed of s; and e is the computed word embedding of the OOV word. Any appropriate hash function may be used, such as a murmur hash.

In some implementations, word embeddings of OOV words may be computed using HashNet embeddings. A word embedding of an OOV word may be computed using different hash functions for each element of the word embedding vector. For example, where word embeddings have length d, hash functions $h_1, h_2, \ldots, h_d$ may be used to compute the elements of the word embedding of the OOV word. The hash functions may be used to select an element from a vector X. For example, a word embedding may be computed as follows:

$$e = [X[H_1(w) \% |X|] X[H_2(w) \% |X|] \ldots X[H_d(w) \% |X|]]$$

The first element of the word embedding may be computed by the following sequence: computing a first hash value of the OOV word, taking the modulus of the hash value based on the length of the vector X, and then selecting an index of the vector X using the modulus of the hash value. The other elements may be computed by performing similar operations but using a different hash function.

The vector X may be determined using a training process, such as the training process described in greater detail below. The training of the vector X may allow for the computation of more meaningful word embeddings for OOV words and thus allow for more accurate suggestions in the processing of FIG. 6.

Encoder neural network component 620 may process the word embeddings of the words of the incomplete message (including possibly a word embedding for an incomplete or OOV word) and compute an input message feature vector that represents the input message in a vector space (that may be a different vector space used for the word embeddings). Encoder neural network component 620 may process the word embeddings using any appropriate neural network, such as a recurrent neural network (or a bidirectional recurrent neural network or a neural network with a long short-term memory component). The same neural network may be used to compute a designated message feature vector for each designated message in the set of designated messages such that the feature vectors may be used to select designated messages as suggestions as described in greater detail herein.

In some implementations, encoder neural network component 620 may compute an input message feature vector as follows:

$$h_t = \sigma_h(U_h x_t + V_h h_{t-1} + b_h)$$

where $x_t$ is an embedding of the $t^{th}$ word, $h_t$ is a hidden state corresponding to the $t^{th}$ word, $h_0$ is an initial state vector, $\sigma_h$ is an activation function (e.g., tanh or a sigmoid), and $U_h$, $V_h$, and $b_h$ are matrices or vectors of parameters. The input message feature vector may correspond to the hidden state computed after processing the final word of the input message.

Neural network selection component 630 may select one or more designated messages as possible suggestions using the input message feature vector. In some implementations, neural network selection component 630 may select designated messages by comparing the input message feature vector with a designated message feature vector corresponding to each designated message of the set of designated messages. For example, any appropriate similarity score (e.g., a cosine similarity or distance function) may be computed between input message feature vector and the designated message feature vector for each designated message. One or more designated messages having a highest similarity or smallest distance may be selected. For example, a fixed number of designated messages may be selected or all designated messages with a similarity score or distance meeting a threshold may be selected. In some instances or implementations, neural network selection component 630 may not select any designated messages, such as when the score of all designated messages is below a threshold.

Prefix tree component 640 may identify one or more designated messages as possible suggestions using a prefix tree (such as a trie). Any appropriate prefix tree may be used. For example, a prefix tree may have a root node that corresponds to the beginning of a message, and an arc or edge for each letter or other character that could be used to start a message. Each arc may end in a node and be followed by additional arcs that indicate possible second characters of the word, and so forth. This process may be continued so that the prefix tree includes a sequence of arcs representing each designated message in the set of designated messages. Each node may indicate whether the sequence of characters starting from the root node correspond to a designated message.

Prefix tree component 640 may receive the characters of the incomplete message and traverse the prefix tree to identify a node corresponding to the sequence of characters of the incomplete message, and this node may be referred to as the input message node. The prefix tree may continue to be traversed past the input message node. All designated messages that are encountered in the prefix tree after the input message node will have the incomplete message as a prefix. In this manner, all designated messages having the input message as a prefix may be determined, and these messages may be referred to as prefix-matching designated messages.

Prefix selection component 650 may then select one or more designated messages from the prefix-matching designated messages as possible suggestions. For example, prefix selection component 650 may compute a prefix score for each prefix-matching designated message and select messages having a highest prefix score (e.g., a number of designated messages having a highest prefix score or all designated messages with a prefix score above a threshold). Any appropriate prefix score may be used. In some implementations, the prefix score may correspond to a frequency score that indicates a number of times that the designated message appeared in the training corpus. In some instances or implementations, prefix selection component 650 may not select any designated messages, such as when the score of all designated messages is below a threshold.

Final selection component 660 may process designated messages selected by neural network selection component 630 and designated messages selected by prefix selection component 650 to make a final selection of one or more designated messages as suggestions. In some instances, final selection component 660 may receive the same designated message from both neural network selection component 630 and prefix selection component 650.

Final selection component 660 may compute a selection score for each designated message. For example, a selection score may be computed as $$s = \text{sim}^{(1/\beta)} + p^\beta$$

or $$s = \text{sim} + \text{max\_sim} \times \beta \times p^\beta$$

where s is the selection score of a designated message, sim is the similarity score of the designated message computed by neural network selection component 630, p is a probability score of the designated message (e.g., a probability of a designated message as determined by a language model or a frequency computed using the number of times the designated message appears in a training corpus), max_sim is the largest similarity score across all designated messages, and β is a parameter less than 1.

In some implementations, a selection score for a designated message may be the same as the similarity score or the prefix score, the maximum of the similarity score and the prefix score, or a weighted combination of the similarity score and the prefix score.

Final selection component 660 may select one or more messages as suggestions using the selection scores. For example, final selection component may select a fixed number of designated messages having the highest selection scores or select all designated messages having a selection score above a threshold.

In some implementations, final selection component 660 may discard designated messages where the selection score is too high. For example, where a designated message is equal to the incomplete message, the selection score may be high, but it may be desired to not present a suggestion that is the same as the message already entered by the user. In some instances, final selection component 660 may not select any messages, such as when all designated messages have scores below a threshold.

In some implementations, final selection component 660 may use submodular maximization or other techniques to prevent the selection of highly similar messages (e.g., "I want to make a payment" and "I need to make a payment"). Presenting two highly similar suggestions may provide a bad experience for the user. For example, selected messages may be compared against each other with a language model to compute a similarity score, and where two messages have a high similarity score, one of the two may be discarded. In some implementations, in addition to discarding messages based on a similarity score, messages may be discarded based upon the meaning of the messages. For example, where the processing relating to two messages would be similar or identical (e.g., "I want to make a payment" may have the same processing as "Please give me billing details"), final selection component 660 may discard one or more of the messages, leaving only one of the messages (e.g., having a highest selection score).

The one more designated messages selected by final selection component 660 may then be presented as suggestions to a user using any appropriate techniques, such as those presented in FIG. 1A.

Figure 7:
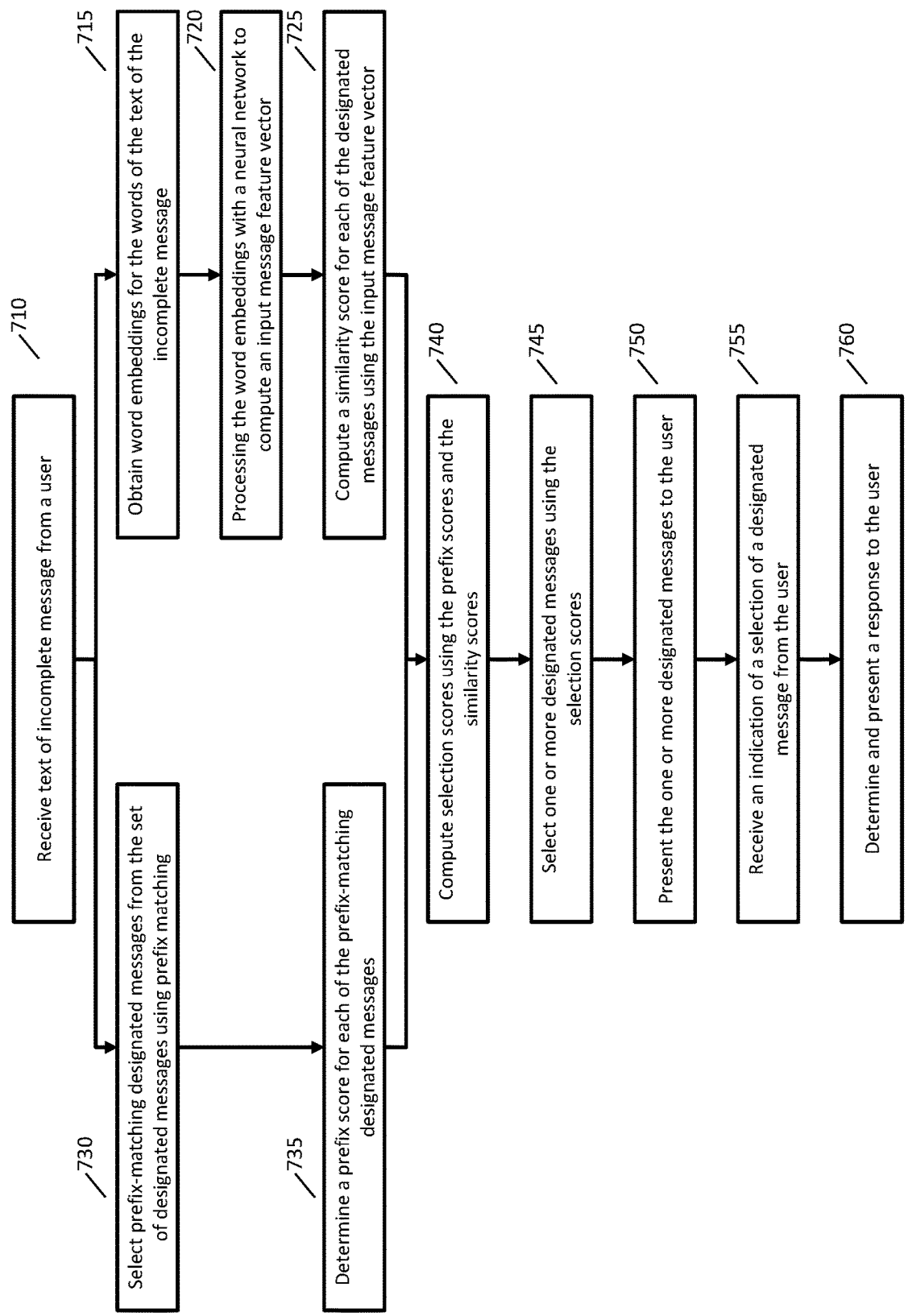
FIG. 7 is an example method for selecting suggested messages using a neural network and/or a prefix tree.

FIG. 7 is a flowchart of an example method for selecting one or more messages as suggestions using a neural network and/or a prefix tree. At step 710, text of an incomplete message entered by a user is received. The text may be processed using a neural network and/or a prefix tree.

Where the text is processed by a neural network, processing proceeds to step 715 where a word embedding is obtained for each word of the incomplete message. Where the message includes one or more OOV words (such as an incomplete word), a single word embedding may be used for all OOV words, a word embedding may be computed for OOV words using the techniques described herein, or OOV words may be skipped (e.g., a sequence of final letters corresponding to an incomplete word). At step 720 the word embeddings are processing with a neural network (e.g., a recurrent neural network) to compute an input message feature vector that represents the text of the incomplete message in a vector space. At step 725, a similarity score may be computed for each designated message using the input message feature vector and a designated message feature vector for each designated message.

Where the text is processed using a prefix tree, processing after step 710 may proceed to step 730. At step 730, a prefix tree may be used to select designated messages that are a prefix match to the text of the incomplete message, and these messages may be referred to as prefix-matching designated messages. At step 735, a prefix score is computed for each of the prefix-matching designated messages, such as a prefix score that is computed using a frequency of the designated message in a training corpus.

At step 740, selection scores are computed for designated messages using the similarity scores computed at step 725 and/or the prefix scores computed at step 735. The selection scores may be computed for all designated messages or a subset of the designated messages, such as a subset of designated messages having high similarity and/or prefix scores. Any appropriate selection score may be computed, such as any of the selection scores described herein.

At step 745, one or more designated messages may be selected using the selection scores. For example, a number of designated messages having a selection score above a threshold may be selected.

At step 750, the selected designated messages may be presented to a user as suggested messages, such as presented in FIG. 1A. At step 755, an indication of a selection of a designated message may be received, such as an indication corresponding to a user clicking or tapping a suggested message. At step 760, processing may be performed corresponding to the selection of the designated message. For example, the same processing may be performed as if the user had entered the message in its entirety instead of selecting a suggested message. The processing corresponding to the selection of the suggested message may include automated processing, such as done by an automated natural language interface, and/or may include processing performed by a person, such as a customer service representative. A result of the processing may then be presented to the user, such as presenting a message to the user to inform the user about the processing that was performed.

Training

The techniques described above may use a neural network to compute an input message feature vector from an input message. The same neural network may also be used to compute designated message feature vectors from designated messages. Now described are techniques for training a neural network to perform these functions.

In some implementations, a neural network may be trained using a denoising auto-encoder. A denoising auto-encoder may include an encoding neural network to process a message and output a message feature vector, such as the input message feature vector described above. A denoising auto-encoder may also include a decoding neural network that processes a message feature vector to generate a message.

Other implementations of auto-encoders (that may not be denoising auto-encoders) may train the encoder and decoder such that the encoder processes a message to generate a message feature vector, and the decoder processes the message feature vector to generate the same message that was input into the encoder. A denoising auto-encoder may be trained so that the encoder processes a "noisy" message (described in greater detail below) to generate a message feature vector and the decoder processes the message feature vector to generate the clean message before noise was added.

Figure 8:
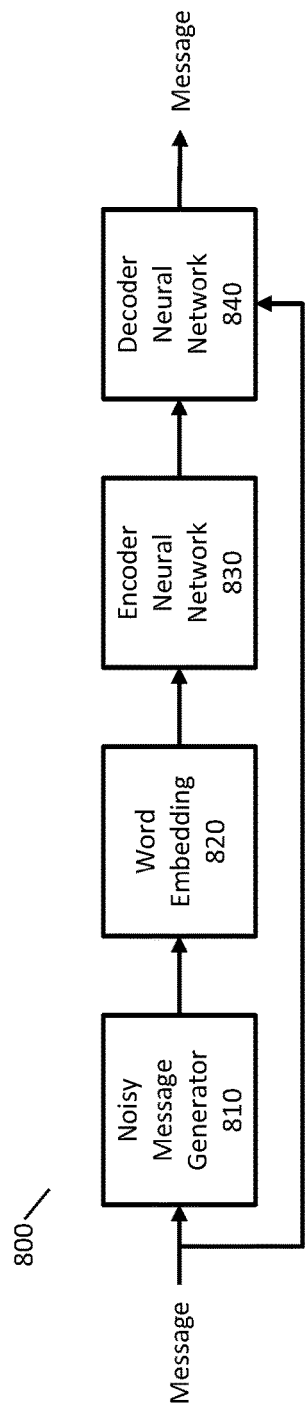
FIG. 8 is an example system for implementing a denoising auto-encoder.

FIG. 8 is an example system 800 that may be used to implement a denoising autoencoder. FIG. 8 includes noisy message generator 810 that processes a message and generates a noisy message by modifying the message. Any appropriate techniques may be used to generate a noisy message from a message. The noisy message may be created, for example, by removing one or more words or characters, adding one or more words or characters, permuting one or more words or characters, substituting one or more words or characters, or any combination of the foregoing. The modifications to create the noisy message may be performed randomly according to a probability distribution.

In FIG. 8, word embedding component 820 may receive the noisy message and obtain or compute word embeddings for each word of the noisy message. Word embedding component 820 may use the same techniques described above for word embedding component 610 or may use different techniques.

Encoder neural network component 830 may receive the word embeddings for the noisy message and compute a message feature vector. Encoder neural network component 830 may use the same techniques described above for encoder neural network component 620 or may use different techniques.

Decoder neural network component 840 may receive the message feature vector for the noisy message and the original, non-noisy message (e.g., receive word embeddings of the non-noisy message or some other indication of the words of the non-noisy message). Decoder neural network component 840 and encoder neural network component 830 may be trained so that the message output by decoder neural network component 840 is the same as the original, non-noisy message received by noisy message generator 810.

Decoder neural network component 840 may process the message feature vector using any appropriate neural network, such as a recurrent neural network (or a bidirectional recurrent neural network or a neural network with a long short-term memory component). Decoder neural network component 840 may use the same type of neural network as encoder neural network component 830 or a different type of neural network.

In some implementations, decoder neural network component 840 may generate a message as follows:

$$s_t = \sigma_s(U_s y_t + V_s s_{t-1} + b_s)$$

$$p_t = \sigma_p(W_p s_t + b_p)$$

where $y_t$ is an embedding of the $t^{th}$ word of a generated message, $s_t$ is a hidden state corresponding to the $t^{th}$ generated word, $p_t$ is an output vector to select the $t^{th}$ word of the generated message from a vocabulary of words, $s_0$ is an initial state vector that may be set to the message feature vector, $\sigma_s$ is an activation function, and $\sigma_p$ is an activation function (such as a softmax function), and $U_s$, $V_s$, $W_p$, $b_s$, and $b_p$ are matrices or vectors of parameters. To start the message generation, $y_1$ may be set to a special value, such as a token indicating the start of a message to be generated.

Figure 9:
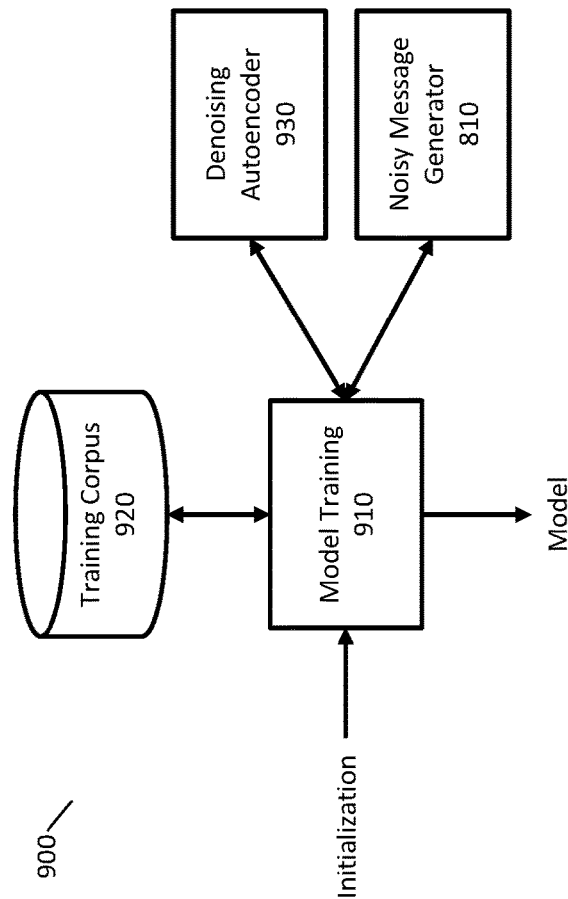
FIG. 9 is an example system for training a mathematical model for suggesting messages.

FIG. 9 is an example system 900 that may be used to train parameters of mathematical models for computing a message feature vector from a message and/or encoder and decoder neural networks for a denoising auto-encoder. In FIG. 9, model training component 910 can be initialized to perform training using training corpus 920. Model training component can iterate over the messages in training corpus 920 to train one or mathematical models using any of the techniques described herein. Model training component 910 can interact with noisy message generator 810 to generate a noisy message from a message in the training corpus using any of the techniques described herein. Model training component 910 can interact with denoising auto-encoder component 930 that may implement a denoising auto-encoder using any of the techniques described herein.

Model training component 910 may iterate over the training data in the training corpus to train a mathematical model. For example, model training component 910 may select a training message from the training corpus, determine a noisy training message by processing the training message with noisy message generator 810, process the original message and the noisy message with denoising auto-encoder component 930, and update the parameters of the mathematical model. Any appropriate techniques may be used to update the model parameters, such as batch processing the of training data and stochastic gradient descent.

Figure 10:
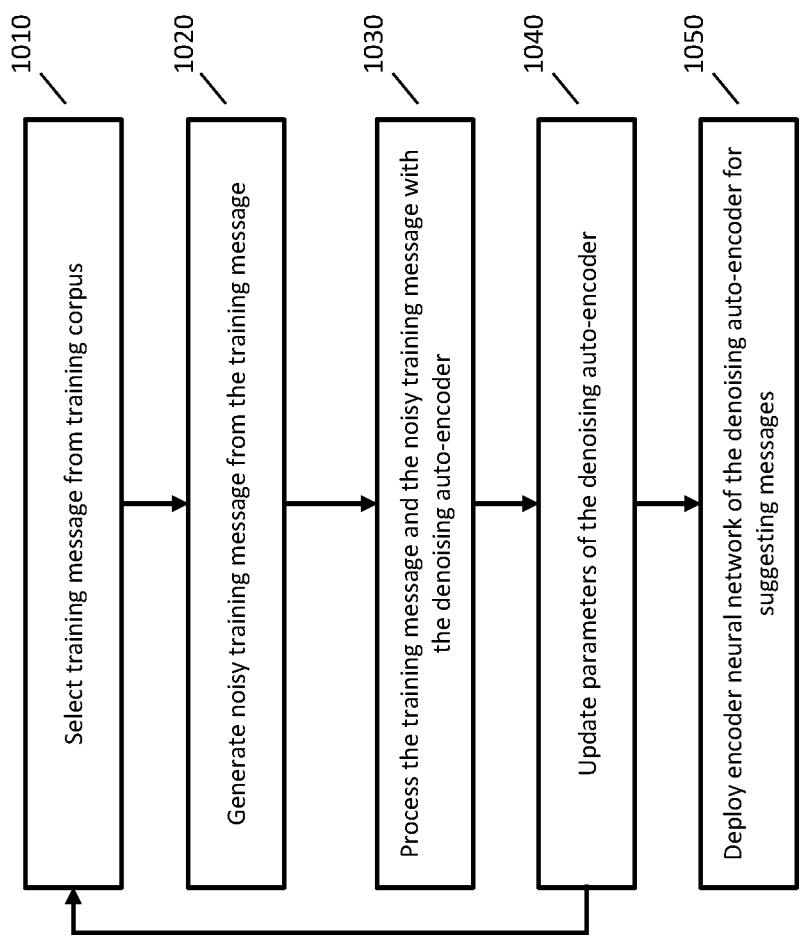
FIG. 10 is an example method for training a mathematical model for suggesting messages.

FIG. 10 is a flowchart of an example implementation of a method for training a mathematical model for suggesting messages. The method may be implemented using a training corpus, such as training corpus 920. Steps 1010 to 1050 may be implemented by iterating over training messages in the training corpus. Steps 1010 to 1050 may be performed by iterating over the training messages one at a time or iterating over the training messages in batches. Steps 1010 to 1050 may be performed multiple times for each training message of the training corpus.

At step 1010, a training message is selected from the training corpus. At step 1020, a noisy training message is generated from the training message, such as by using any of the techniques described herein. At step 1030, the training message and the noisy training message are processed by a denoising auto-encoder. For example, representations of the words of the training message and the noisy training message (e.g., word embeddings or indices into the vocabulary of words) may be processed by the denoising auto-encoder. At step 1040, parameters of the denoising auto-encoder are updated, such as by using stochastic gradient descent. After step 1040, if additional training data remains to be processed, then processing may proceed to step 1010 where another training message is selected from the training corpus. After step 1040, if training is complete, then processing may proceed to step 1050 where the encoder neural network of the denoising auto-encoder may be deployed to suggest messages.

In some implementations, other techniques may be used to train a neural network for computing feature vectors from messages. Generative supervised techniques, generative semi-supervised techniques, or generative unsupervised techniques may be used as described in U.S. patent application Ser. No. 15/863,225, which is incorporated herein by reference in its entirety. Discriminative techniques may also be used. In some implementations, labelled training data may be used to train a neural network, such as a corpus of training data that includes messages (or partial messages) entered be users and corresponding suggested messages. The labelled training data may be obtained for example by having people identify appropriate suggested messages for messages or partial messages.

Implementation

After the set of designated messages has been selected, the mathematical model for computing a message feature vector from a message has been trained, and designated message feature vectors have been computed for each of the designated messages, the mathematical model and designated messages may be used in a production system, such as system 200 of FIG. 2, to suggest responses to messages.

Figure 11:
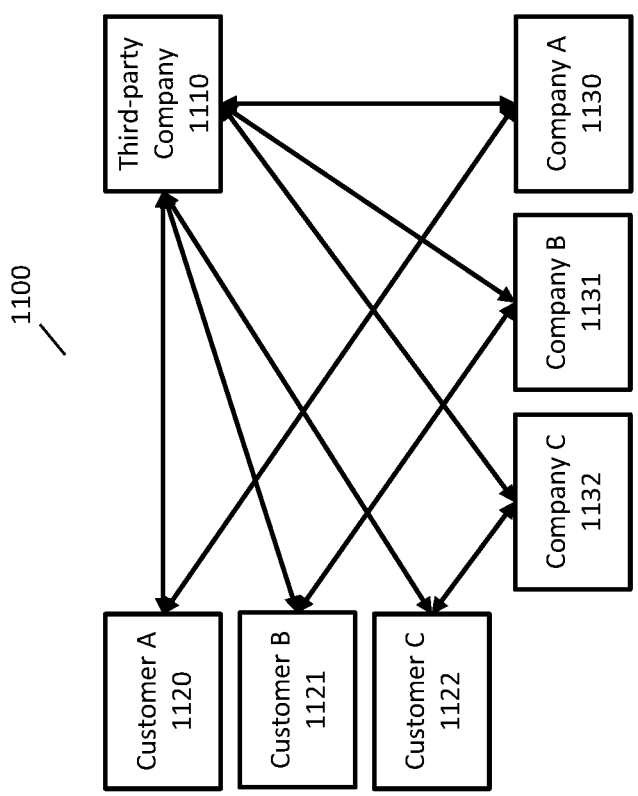
FIG. 11 is an example system whereby a third-party company provides message suggestion services to other companies.

In some implementations, a third-party company may provide services to other companies to suggest messages to customers, employees, or other people affiliated with the companies. For example, a company may provide a messaging application for use by its customers, and the company may use services of the third-party company to process an incomplete message of a customer as it is being entered by the customer to suggest a message for the customer. For another example, a company may provide customer support to its customers via a messaging platform, and the company may use the services of the third-party company to suggest messages to customer service representatives and/or customers. A company may find it more cost effective to use the services of the third-party company than to implement its own suggestion services. FIG. 11 illustrates an example architecture that may be used by a company to obtain assistance from a third-party company in providing customer support to its customers. A similar architecture may be used by a company that provides a messaging platform to its customers.

FIG. 11 illustrates a system 1100 that allows third-party company 1110 to provide message suggestion services to multiple companies. In FIG. 11, third-party company 1110 is providing message suggestion services to company A 1130, company B 1131, and company C 1132. Third-party company 1110 may provide message suggestion services to any number of companies.

Customers of each company may seek customer support from a company where the support process uses the services of third-party company 1110. For example, customer A 1120 may be seeking support from company A 1130, customer B 1121 may be seeking support from company B 1131, and customer C 1122 may be seeking support from company C 1132. It may or may not be apparent to the customers whether they are using services of third-party company 1110.

Third-party company 1110 may assist a company in providing message suggestion services in a variety of ways. In some implementations, third-party company 1110 may assist in connecting a customer with a customer service representative working on behalf of the company. For example, third-party company 1110 may select a customer service representative, may provide a user interface to a customer to make it easier for a customer to request support, and may provide a user interface to a customer service representative to assist the customer service representative in responding to a request of a customer. A customer service representative may have any appropriate relationship with the company on behalf of which it is providing customer support. For example, a customer service representative may be an employee or contractor of a company and providing customer support to only customers of that company, or a customer service representative may be providing services to multiple companies and providing support to customers of the multiple companies at the same time.

The network communications between third-party company 1110, customers, and companies may be architected in a variety of ways. In some implementations, all communications between a customer and a company may be via third-party company 1110 and there may not be any direct connection between the customer and the company. In some implementations, third-party company 1110 may communicate with the company but may not communicate directly with the customer. In some implementations, a customer may communicate directly with the company and also third-party company 1110.

Where a customer is connected to both a company and third-party company 1110, each of the two connections may be used for different kinds of requests. For example, where the customer is interacting with the company in a way that does not require the services of third-party company 1110 (e.g., navigating a web site of the company), the customer may use the network connection with the company. Where the customer is interacting with the company in a way that uses the services of third-party company 1110, the customer may use the network connection with third-party company.

It may not be apparent to the customer whether the customer is using a network connection with the company or with third-party company 1110.

Figure 12:
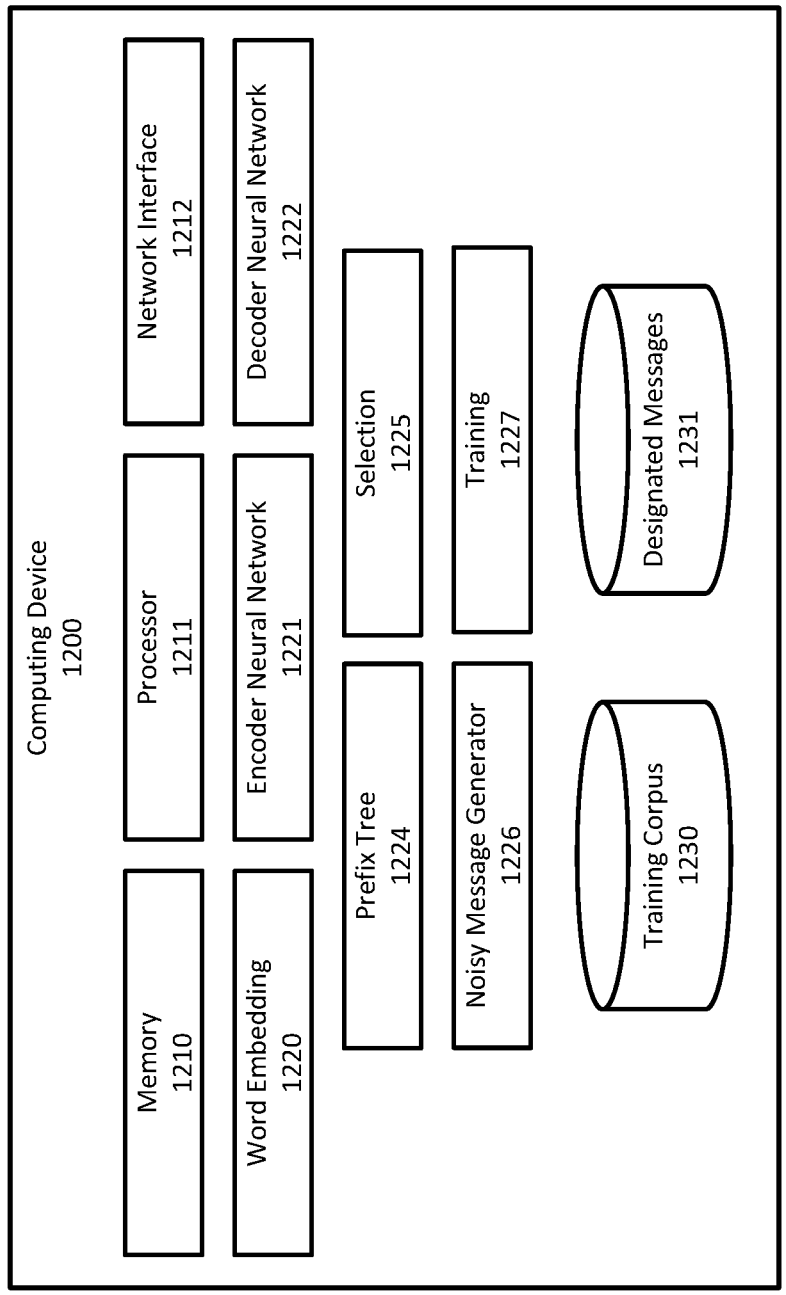
FIG. 12 is an exemplary computing device that may be used to suggest messages and/or training a mathematical model for suggesting messages.

FIG. 12 illustrates components of one implementation of a computing device 1200 for implementing any of the techniques described above. In FIG. 12, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1200 may include any components typical of a computing device, such as volatile or nonvolatile memory 1210, one or more processors 1211, and one or more network interfaces 1212. Computing device 1200 may also include any input and output components, such as displays, keyboards, and touch screens. Computing device 1200 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1200 may have a word embedding component 1220 that may compute word embeddings or obtain previously-computed word embeddings using any of the techniques described herein. Computing device 1200 may have an encoder neural network component 1221 that may compute a message feature vector by processing a message using any of the techniques described herein. Computing device 1200 may have a decoder neural network component 1222 that may generate a message by processing a message feature vector using any of the techniques described herein. Computing device 1200 may have a prefix tree component 1224 that may find designated messages that are prefix matches for an input message using any of the techniques described herein. Computing device 1200 may have a selection component 1225 that may select designated messages as suggestions using information about prefix matches and/or message feature vectors using any of the techniques described herein. Computing device 1200 may have a noisy message generator component 1226 that may generate a noisy training message from a training message using any of the techniques described herein. Computing device 1200 may have a training component 1227 that may train a mathematical model for suggesting messages using any of the techniques described herein.

Computing device 1200 may include or have access to various data stores. Data stores may use any known storage technology such as files, relational databases, non-relational databases, or any non-transitory computer-readable media. Computing device 1200 may have training corpus data store 1230 that may be used to train mathematical models for suggesting messages. Computing device 1200 may have designated messages data store 1231 that may store a set of designated messages that may be used to suggest messages to a user.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for suggesting a message using a neural network, the method comprising:

receiving text of an incomplete message as the incomplete message is being entered by a user;
obtaining word embeddings for the text of the incomplete message, wherein a word embedding represents a corresponding word in a first vector space;
processing the word embeddings with the neural network to compute an input message feature vector, wherein the input message feature vector represents the incomplete message in a second vector space;
obtaining a set of designated messages, wherein each designated message is associated with a designated message feature vector, and a designated message feature vector represents a corresponding designated message in the second vector space;
computing a similarity score for each designated message of the set of designated messages by processing the input message feature vector and the designated message feature vectors, wherein a first similarity score for a first designated message is computed using the input message feature vector and a first designated message feature vector corresponding to the first designated message;
selecting the first designated message from the set of designated messages using the first similarity score;
presenting the first designated message to the user;
receiving a selection of the first designated message from the user;
determining a response by processing the selection of the first designated message; and
transmitting the response to the user.

2. The computer-implemented method of claim 1, wherein the user is a customer of a company and the text of the incomplete message relates to a customer support request.

3. The computer-implemented method of claim 1, comprising:
selecting a plurality of designated messages from the set of designated messages, wherein each of the plurality of designated messages is a prefix match for the text of the incomplete message;
computing a prefix score for each of the plurality of designated messages; and
selecting the first designated message using the prefix scores.

4. The computer-implemented method of claim 3, wherein the prefix score indicates a frequency of the corresponding designated message in a corpus of messages.

5. The computer-implemented method of claim 3, wherein:
the plurality of designated messages comprises the first designated message;
selecting the first designated message comprises using a first prefix score corresponding to the first designated message and the first similarity score.

6. The computer-implemented method of claim 5, comprising:
computing a first selection score for the incomplete message using the first prefix score and the first similarity score; and
selecting the first designated message using the first selection score.

7. The computer-implemented method of claim 6, wherein the first selection score is a maximum of the first prefix score and the first similarity score.

8. The computer-implemented method of claim 1, comprising:

receiving second text of a second incomplete message as the second incomplete message is being entered by the user;

computing a second input message feature vector using the second text and the neural network; and deciding not to suggest any messages to the user.

9. A system for suggesting a message, the system comprising:

at least one server computer comprising at least one processor and at least one memory, the at least one server computer configured to:

receive text of an incomplete message as the incomplete message is being entered by a user;

obtain word embeddings for the text of the incomplete message, wherein a word embedding represents a corresponding word in a first vector space;

process the word embeddings with a neural network to compute an input message feature vector, wherein the input message feature vector represents the incomplete message in a second vector space;

obtain a set of designated messages, wherein each designated message is associated with a designated message feature vector, and a designated message feature vector represents a corresponding designated message in the second vector space;

compute a similarity score for each designated message of the set of designated messages by processing the input message feature vector and the designated message feature vectors, wherein a first similarity score for a first designated message is computed using the input message feature vector and a first designated message feature vector corresponding to the first designated message;

select the first designated message from the set of designated messages using the first similarity score; and present the first designated message to the user.

10. The system of claim 9, wherein the user is a customer of a company and the system is implemented by a third-party company providing services to the company.

11. The system of claim 9, wherein the neural network was trained using a denoising auto-encoder.

12. The system of claim 11, wherein the neural network was trained by:

obtaining a training message from a training corpus;

generating a noisy training message by modifying the training message;

setting an input of the denoising auto-encoder to the noisy training message;

setting an output of the denoising auto-encoder to the training message; and updating parameters of the denoising auto-encoder using stochastic gradient descent.

13. The system of claim 9, wherein the at least one server computer is further configured to receive an edit by the user of the first designated message.

14. The system of claim 9, wherein the at least one server computer is configured to:

select a second designated message from the set of designated messages using a second similarity score corresponding to the second designated message; and present the second designated message to the user.

15. The system of claim 9, wherein selecting the first designated message comprises:

obtaining a first probability score for the first designated message;

computing a first selection score for the first designated message using the first probability score and the first similarity score; and selecting the first designated message using the first selection score.

16. The system of claim 15, wherein the first probability score indicates a frequency of the first designated message in a corpus of messages.

17. One or more non-transitory, computer-readable media comprising computer-executable instructions that, when executed, cause at least one processor to perform actions comprising:

receiving text of an incomplete message as the incomplete message is being entered by a user;

obtaining word embeddings for the text of the incomplete message, wherein a word embedding represents a corresponding word in a first vector space;

processing the word embeddings with a neural network to compute an input message feature vector, wherein the input message feature vector represents the incomplete message in a second vector space;

obtaining a set of designated messages, wherein each designated message is associated with a designated message feature vector, and a designated message feature vector represents a corresponding designated message in the second vector space;

computing a similarity score for each designated message of the set of designated messages by processing the input message feature vector and the designated message feature vectors, wherein a first similarity score for a first designated message is computed using the input message feature vector and a first designated message feature vector corresponding to the first designated message;

selecting the first designated message from the set of designated messages using the first similarity score; and presenting the first designated message to the user.

18. The one or more non-transitory, computer-readable media of claim 17, wherein obtaining the word embeddings comprises computing a word embedding for an out-of-vocabulary word using a hash function.

19. The one or more non-transitory, computer-readable media of claim 17, wherein the neural network is a recurrent neural network.

20. The one or more non-transitory, computer-readable media of claim 17, wherein the first similarity score is computed using a cosine similarity between the input message feature vector and the first designated message feature vector.

21. The one or more non-transitory, computer-readable media of claim 17, wherein the set of designated messages was obtained from a data store of messages received from customers of a company.

* * * * *